United States Patent [19]

Banks et al.

[11] 4,280,820

[45] * Jul. 28, 1981

[54] STEAM REFORMING PROCESS

[75] Inventors: Reginald G. S. Banks, Olton; Alan Williams, Cheswick Green, both of England

[73] Assignee: British Gas Corporation, London, England

[*] Notice: The portion of the term of this patent subsequent to Aug. 5, 1997, has been disclaimed.

[21] Appl. No.: 119,979

[22] Filed: Feb. 8, 1980

Related U.S. Application Data

[62] Division of Ser. No. 923,550, Jul. 11, 1978, Pat. No. 4,216,123.

[30] Foreign Application Priority Data

Jul. 11, 1977 [GB] United Kingdom ............... 5655/77

[51] Int. Cl.³ .............................................. C10G 11/02
[52] U.S. Cl. ................................................. 48/214 A
[58] Field of Search ............... 48/214 A; 252/466 J, 252/466 PT; 423/653, 654

[56] References Cited

U.S. PATENT DOCUMENTS

| | | | |
|---|---|---|---|
| 3,926,584 | 12/1975 | Odsetts | 48/214 A |
| 4,042,532 | 8/1977 | McArthur | 48/214 A |
| 4,216,123 | 8/1980 | Banks et al. | 252/466 J |

FOREIGN PATENT DOCUMENTS 969637 9/1964 United Kingdom ............... 48/214 A

Primary Examiner—Peter F. Kratz

[57] ABSTRACT

Methane-containing gases are produced by the catalytic-stream-reforming of hydrocarbon feedstocks using a catalyst which includes a Group VIII metal such as nickel and alumina, and which in its calcined but unreduced precursor form has a pore size distribution defined as follows:

(i) at least 55% of the pore volume of pores having a pore radius between 12 and 120 Angstrom Units is in the range of 12–30 Angstrom Units, and (ii) the ratio of the pore volume contained in pores of 10–50 Å to the pore volume contained in pores 50–300 Å is at least 5:1.

8 Claims, 3 Drawing Figures

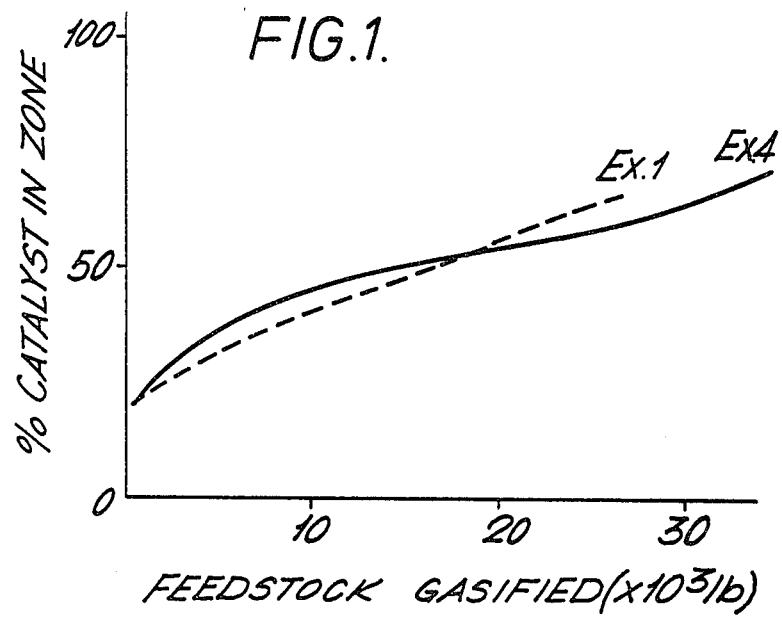
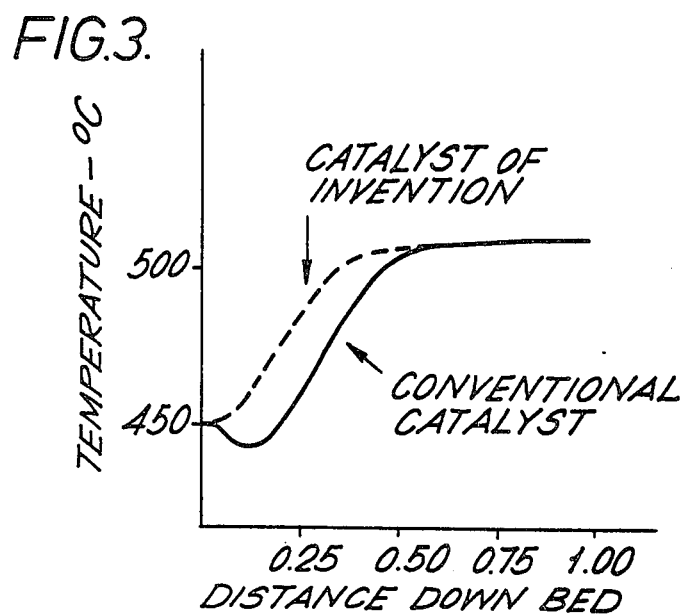

STEAM REFORMING PROCESS

This application is divisional application of application Ser. No. 923,550, filed July 11, 1978, now U.S. Pat. No. 4,216,123.

BACKGROUND OF THE INVENTION

This invention relates to catalysts and, more particularly, to catalysts employed for the steam reforming of hydrocarbons in the manufacture of methane containing gases, for example, Substitute Natural Gas, SNG.

Catalysts comprising nickel and alumina have been known for many years which are useful in the catalytic steam reforming of hydrocarbons. However, over the years considerable development of the catalysts has occurred, particularly to meet and overcome problems imposed by the feedstocks employed in the gasification processes.

In U.K. Patent Specification No. 1,342,020 there is described and claimed a method for preparing catalytic materials containing inter alia a Group VIII metal and alumina, by co-precipitation at a temperature of 50° to 100° C. using an alkali bicarbonate as the precipitating agent.

U.K. Patent Specification No. 1,462,060 described the preparation of catalysts comprising a Group VIII metal, e.g., nickel alumina, by coprecipitation using alkali carbonates as the precipitants.

The preparative routes taught by the prior art involve either adding a solution of the catalytic agents to the precipitant solution or admixing both solutions simultaneously, preferably at a temperature of 80° C. or above.

A general discussion of the art of steam reforming in the manufacture of methane-containing gases and of the problems which have arisen and have been overcome in disclosed in U.S. Pat. No. 4,105,591. This patent also describes catalysts which have improved resistance both to deactivation by polymer formation and to sintering.

Polymer resistance is particularly important when gasifying heavy feedstocks such as kerosine and gas oil.

Hitherto it has been possible to avoid polymer formation with these feedstocks only by employing high preheat or inlet temperatures. The use of such high inlet temperatures leads to high outlet temperatures, with the result that the methane concentration in the product was not as high as it would have been with lower preheat temperatures. The use of high working pressures also tends to increase the outlet temperature.

We have now found that catalysts can be produced which are capable of giving satisfactory performance in the gasification of kerosine with a preheat of 500° C., against preheats of 550° C. and above as required for commercially available catalysts for this feedstock.

SUMMARY OF THE INVENTION

We have found that this catalysts' performance, or in other words its resistance to both polymer deactivation and sintering, especially its polymer resistance, is directly related to the distribution of the pore sizes in the catalyst and to the manner in which the catalyst is prepared.

These improved catalysts are characterized by preparation methods involving the minimum of heat treatment and are further characterized having a very high strength and density and by having a pore size distribution with a maximum at about 20 Angstrom Units pore radius in the range of pore sizes from 12 to 120 Angstrom Units and a certain pore size ratio, as hereinafter defined as the Q ratio. The pore size distribution relates to the volume of pores to the pore radii as defined at page 150 of "Adsorption Surface Area and Porisity" by S. J. Gregg and K. S. W. Sing, Acadamic Press, 1967.

In accordance with the present invention there is provided a catalyst for steam reforming hydrocarbons comprising a metal of Group VIII of the Periodic Table, alumina and optionally, minor amounts of an alkali or alkaline earth metal characterized in that, in the calcined but unreduced form of the catalyst, (i) at least 55% of the pore volume of pores having a pore radius between 12 and 120 Angstrom Units is in the range of 12 to 30 Angstrom Units, and (ii) the ratio (Q) of the pore volume contained in pores of radius 10 to 50 Angstrom Units to the pore volume contained in pores of radius 50–300 Angstrom Units is at least 5:1.

The present invention further provides a process for the production of steam reforming catalysts as defined above, wherein a water-insoluble compound of a Group VIII metal and alumina are formed by coprecipitation of the Group VIII metal and aluminium followed by the steps of washing and filtering the precipitate, calcining the washed and filtered precipitate to form a precursor comprising at least one oxide of the Group VIII metal and alumina, and reducing the precursor to the active form of the catalyst, characterized in that the precipitation is effected at a temperature of not greater than 60° C. by adding a precipitating agent comprising an aqueous solution of an alkali metal carbonate to the mixed solution and thereafter maintaining the temperature of the formed precipitate at not greater than 60° C. until it is calcined.

Typical examples of Group VIII metals which may be employed in the catalysts of the invention are cobalt and nickel, nickel being the most preferred metal. The catalyst of the invention may contain amounts of other metal compounds, e.g., promoters, these amounts being those conventionally used in the field of catalysts, particularly steam reforming catalysts.

In accordance with the present invention there is also provided a process for the gasification of hydrocarbon feedstocks and for the production of methane-containing gases, which process comprises passing the vapor of a hydrocarbon feedstock having a boiling point of not more than about 360° C. and steam over a catalyst in accordance with the invention, the reaction being carried out at elevated pressure and a temperature of from 350° to 650° C. at the inlet of the catalyst, with an exit temperature of at least 450° C.

The process may be carried out at pressures in excess of 25 ats. and preferably carried out at pressures of at least 45 atmospheres. The steam to feed ratio is preferably at least 1.5:1 and preferably of the order of 2:1.

The feedstock may be any vaporisable hydrocarbon feedstock whose boiling point is not greater than about 350°/360° C. However, the process of the invention may be utilized, with considerable advantage, for gasifying heavy feedstocks such as heavy naphthas, kerosines and gas oils.

It has been conventional practice to raise the inlet temperature of the reactants during the gasification process to secure the greatest benefits from catalyst performance. However, with the catalysts of the present invention, it is possible to operate at a constant inlet or preheat temperature which, typically, is about 500° C. or more for heavy feedstocks.

The catalysts of the invention may be used, with advantage, in the processes described in our U.S. Pat. No. 4,105,591 our prior UK Patent Specification Nos. 820,257, 969,278, 1,500,066, 1,152,009, 1,155,843, 1,265,481 and their United States counterparts such as U.S. Patent Nos. 3,415,634, 3,441,395, 3,469,957, 3,515,527, 3,625,665 and 3,642,460.

We have found that the catalysts of the invention have superior performance characteristics, particularly in regard to resistance to polymer deactivation, over known catalysts. This improved performance, it is believed, is attributable to physical properties imparted to the catalysts by the novel method of preparation. However, it has also been recognized that the chemical composition has its effects upon catalyst performance.

Thus, preferably the catalysts of the invention have the nickel-alumina ratios described in our U.S. Pat. No. 4,105,591. Accordingly, the weight of nickel to alumina in the catalyst may range from 2.8 to 3.2 Ni:1Al$_2$O$_3$ to give a corresponding nickel content from 57 to 63% by weight in the calcined form.

The catalysts of the invention may have not more than 0.4% K and, more preferably, should not have more than C.3% K. Although sodium may desirably be absent from the catalyst, it may be preferred to have sodium levels of about 0.01%, particularly if potassium is also present.

Where both sodium and potassium are present, the atomic ratio of Na to K may be from 10/90 to 30/70, and commercially acceptable catalyst compositions may fall within the area defined by the lines OE, EX, XY, YB, BZ, ZO, as shown in FIG. 1 of the drawings accompanying U.S. Pat. No. 4,105,591, which is a graph of the relationship between sodium and potassium. The lines AB, BC, CD and DE define the uppermost limits for both sodium and potassium.

In terms of catalyst composition the catalyst should, preferably contain less than 0.005 gm atoms Na and not more than 0.011 gm atom K per 100 gm catalyst, the total gm atom alkali should be less than 0.011 gm atom/100 gm catalyst.

The catalysts of the present invention may be prepared by the "constant temperature precipitation" technique, which is generally well known in the art of catalyst production. However, hitherto precipitation has been carried out at temperatures at or near 100° C. and the precipitated product boiled at completion of precipitation. It had also been preferred to employ a "falling temperature precipitation" technique. The temperature at which the precipitation is carried out, in accordance with the present invention, is not greater than about 60° C., and preferably, ranges from room temperature up to about 60° C.

The post precipitation treatment steps are similar to those generally employed hitherto in the art of catalyst production and are described for example in UK Patent Specification Nos. 1,150,066 and 1,155,843 as well as in our U.S. Pat. No. 4,105,591.

However, it is preferred to carry out washing and filtering of the precipitate at temperatures which are not greater than that at which precipitation was effected, viz, not greater than 60° C. In any event, boiling of the catalyst slurry precursor is to be avoided. In addition, it is to be preferred to dry the catalyst in the shortest possible time at the lowest practicable temperature.

The catalysts of the invention are generally characterized by having greater densities than those coprecipitated catalysts prepared by other methods, e.g., at boiling temperature. This effect of greater density is believed to be directly attributable to the method of this invention. Typically, the catalysts of the invention, in the calcined but non-reduced form, have a bulk density of at least 1.2 gm/ml (this density being determined upon 1.125 inch equant cylindrical pellets).

The catalysts of the invention may be further characterized in having high crush strengths, typically of the order of 9.0 Kg or more, this crush strength being determined across the diameter of 0.125 equant cylindrical pellets of the calcined but non-reduced form of catalyst, using a Schleuniger Tablet Hardness Tester.

The catalysts of the invention are also essentially characterised by their Q factor, Q being defined by the relationship:

$$Q = \frac{\text{Pore Volume in pores 10-50 A radius}}{\text{Pore Volume in pores 50-500 A radius}}$$

in which Q must be at least 5:1 and preferably greater than 10.1.

The invention will be described in greater detail with reference to the following Examples and accompanying drawings.

BRIEF DESCRIPTION OF THE DRAWINGS

FIGS. 1 and 2 are graphs wherein the amount of feedstock gasified is plotted against the amount of catalyst used or consumed.

FIG. 3 is a reaction temperature profile showing the temperature of the catalyst at various points down the catalyst bed.

EXAMPLE 1

Figure 2:
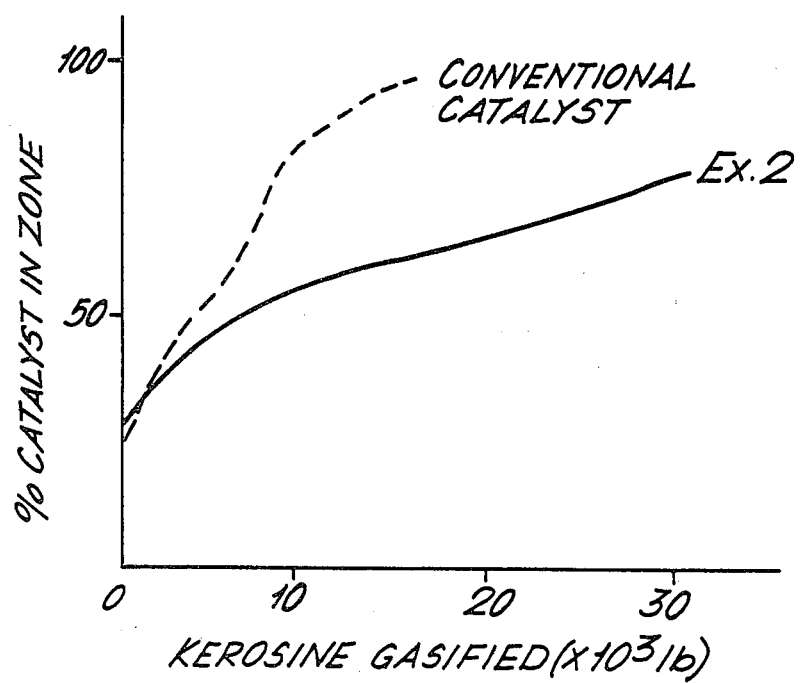

31.8 Kg of nickel nitrate, hydrate and
15.8 Kg of aluminium nitrate, hydrate
were dissolved in 80 liters of water, and
24.4 Kg of sodium carbonate were dissolved in 64 liters of water.

Both solutions were heated to 60° C. The carbonate solution was added to the nitrate solution with vigorous stirring. During the addition the slurry was periodically heated to maintain its temperature at 60±1°. The precipitation took 65 minutes. At the end of this time the slurry was not heated but was pumped directly to the rotary vacuum filter for washing. The filter cake formed was washed on the filter by spraying with pure water at 60° C. The cake was dropped into warm water and made up to 180 liters. After heating to 60° the filtration-washing reslurry cycle was repeated, and in all the catalyst received six filtrations. The cake from the sixth filtration was blended with sufficient potassium carbonate solution to give the final catalyst having a K content of about 0.2 wt.%. Blended cake was dried overnight at 125° C. then calcined at 450° C. for two hours. The calcined catalyst was crushed to pass an 18 mesh sieve, was then blended with 2% by weight of graphite as a pellet lubricant and was then pelleted to ⅛×⅛ inch.

The finished catalyst had the following composition and properties:
Nickel content—59.5%
Sodium content—0.01%
Potassium content—0.18%
Crush strength—13.8 Kg
Bulk density—1.36 gm/ml 55% of the pore volume of pores with a radius of 12-120 A° was contained in pores with a radius of 12-30 A°.

$Q = 7.29$

EXAMPLE 2

This Example was made by the same precipitation method as Example 1, constant temperature precipitation at 60° C., and using the same solutions. It was washed as in the previous Example. Rather than being made up to 0.2% potassium, this Example was made up alkali free. Instead of blending the final filer cake with potassium carbonte the cake was then taken directly to the drying oven and dried at 125° C. After calcining 450° C. the catalyst was ground and pelleted as in Example 1. The finished catalyst had the following composition and properties:
Nickel content—60.2%
Sodium content—0.01%
Crush strength—9.3 Kg
Bulk density—1.45 gm/ml
69% of the pore volume of pores with a radius of 12-120 A° was contained in pores with a radius of 12-30 A°.

$Q = 9.0$.

EXAMPLE 3

This Example was prepared using the same amounts of chemicals and water as used in the previous Examples, but it was prepared by constant temperature precipitation at room temperature. The nitrates were dissolved in water without heating. The sodium carbonate required heating to dissolve it and the resulting solution was heated to 50° C. to avoid it crystallizing out in the pipework. The carbonate was added to the nitrate solution without external heating. The precipitation took 35 minutes, during which time the temperature rose from 13° C. to 22° C. At the end of the precipitation the catalyst was washed as in Example 1. The catalyst was made up alkali free as in Example 2, but rather than being dried at 125° C., it was dried at 30° C., a process which took 3-4 days. After drying it was calcined and pelleted as described in previous Examples. The finished catalyst has a Q value of 27.0 and a bulk density of about 1.6 gm/ml. 71% of the pore volume or radius 12-120 A° had a pore radius of 12-30 A°.

| Ni | 58% | K | 0.00 |
|---|---|---|---|
| Al$_2$O$_3$ | 21.2% | Crush Strength | 15.2 Kg |
| Na | 0.03% | | |

EXAMPLE 4—COMPARATIVE EXAMPLES

Example 4A

A catalyst was prepared in accordance with Example 4 of U.S. Pat. No. 4,105,591. It was made using the same quantities and concentrations of reagents as in the previous Examples. It was made by constant temperature precipitation, but the precipitation was conducted at 90° C. rather than 60° C. Precipitation took 50 minutes. After precipitation the slurry was heated to boiling, in 20 minutes, and was then boiled for 30 minutes. After boiling the catalyst was treated exactly as was Example 1 except that washing was conducted at 90° C. The final catalyst had the following composition and properties:
Nickel content—57.6%
Sodium content—0.01%
Potassium content—0.21%
Crush strength—5.1 Kg
Bulk Density—0.99 gm/ml
11% of the pore volume of pores with a radius of 12-120 A° was contained in pores with a radius of 12-30 A°.

$Q = 0.91$.

EXAMPLES 4B-4H

Seven samples were prepared, each of about 100 gms, by precipitating a nitrate solution containing:
Nickel nitrate, hydrate—384.4 gm
Aluminium nitrate, hydrate—164.8 gm
dissolved in 2 liters of water. Precipitation was conducted at one of two temperatures, 60° and 80°; using one of three precipitants; sodium carbonate, sodium bicarbonate and potassium bicarbonate, and using two modes of precipitation:
1. Parallel precipitation, in which nitrate and carbonate solutions are added to a beaker of water so as to maintain a suitable pH.
2. Reverse precipitation, in which a nitrate solution is added to a beaker of precipitant.

The parallel precipitation mode was used only with sodium carbonate; bicarbonate has too low a pH for it to be used to control the precipitation pH at the value required. Potassium bicarbonate was used to prepare only one sample (sample H) as a comparison with the sodium samples.

Details of the preparations of the various samples were:

B. 280 gm of sodium carbonate (anhydrous) were dissolved in 1.3 liters of water and heated to 70°. The nitrate solution was heated to 60°. One liter of water was taken in a beaker and heated to 60° on a gas ring. The nitrate and carbonate solutions were pumped into the beaker of water using two peristaltic pumps. The temperature of the precipitation beaker was controlled at 60° by manual adjustment of the gas ring. The pH of the precipitating mixture was checked with pH papers at frequent intervals and the peristaltic pumps adjusted manually to keep the pH at 8 to 8.5. The precipitation time was 20 minutes and 260 ml of the nitrate solution remained when all the carbonate had been used up. The result was a pale apple green slurry. The slurry filtered rapidly when placed on a Buchner filter. It was washed free of sodium by washing on the filter with 6×3 liter portions of cold water. The resulting cake was a pale apple green color. On drying at 125° it formed a light pale green solid that rapidly disintegrated into soft evenly sized granules, 1-2 cm across. On calcination at 450° the catalyst formed soft granules of a greenish black colour. The catalyst was crushed by pressing on a sieve with a plastic spatula and was then pelleted to ⅜ inch (diameter)×⅛ inch (height).

C. 280 gm of sodium carbonate were dissolved in 2 liters of water. This solution and the nitrate solution were heated to 60° and then the nitrate solution was pumped into the carbonate solution using a peristaltic pump. The precipitation time was 20 minutes and during this time the temperature of the carbonate was kept at 60°. The result was a pale blueish green slurry, pH 8.2, which filtered more slowly than that of sample 1. The catalyst was worked up as described for sample B. At the calcined stage it formed soft grey lumps.

D. 500 gm of sodium carbonte were dissolved in 1.4 liters of water. The precipitation was conducted as for sample 1 except that the temperature was kept at 80°. After precipitation, which took 25 minutes, some of the carbonate remained unused. Before filtration the slurry was held at 80° for 25 minutes and was then worked up as described for sample 1. As for sample B, it formed pale apple green granules at the dry stage and greenish black granules at the calcined stage.

E. This sample was made exactly as for sample 2 except that the precipitation was conducted at 80°. The precipitation time was 25 minutes and the final pH was 8.4.

F. 349.5 gm of sodium hydrogen carbonate were dissolved in 2.5 liters of water. Precipitation was done exactly as described for sample 2. The precipitation time was 15 minutes and the final pH 7.5. The apple green slurry formed filtered rapidly and the catalyst was worked up as described for sample B.

G. This sample was made as described for sample F, except that the precipitation was carried out at 80°. The final pH was 7.8. The apple green slurry filtered reasonably rapidly, but markedly slower than that of sample F.

H. This sample was made exactly as was sample F except that 416.5 gm of potassium hydrogen carbonate were used in place of the sodium hydrogen carbonate.

The pore size distributions of the seven final catalysts were determined on the Micromeritics Digisorb 2500 instrument. Samples of about 0.5 to 0.7 gm of the final pelleted catalysts were used and the samples were outgassed for 3 hours at 400° before the measurements were made. The adsorption and desorption isotherms for each of the samples were determined using nitrogen as adsorbate at −196°, the boiling point of liquid nitrogen. Pore size distributions measured in this way cover the range of pores from 10 to 300 Å radius.

The following Table shows the pore size distributions found, plotted in the form of differential pore size distributions; i.e. the pore volume per unit increment of pore radius plotted as a function of pore radius, for Comparative Examples 4A–4H as well as for a catalyst in accordance with the invention Examples 1 to 3.

| Example No. | Precipitant | Precipitation Mode* | Temperature | Pore Size Distribution %** | Q Value |
|---|---|---|---|---|---|
| 1 | $Na_2CO_3$ | Forward | 60° | 55 | 7.29 |
| 2 | $Na_2CO_3$ | Forward | 60° | 69 | 9.00 |
| 3 | $Na_2CO_3$ | Forward | Ambient | 71 | 27.00 |
| 4A | $Na_2CO_3$ | Forward | 90° C. | 11 | 0.91 |
| 4B | $Na_2CO_3$ | Parallel | 60° C. | 64 | 1.59 |
| 4C | $Na_2CO_3$ | Reverse | 60° C. | 42 | 0.99 |
| 4D | $Na_2CO_3$ | Parallel | 80° C. | 21 | 0.95 |
| 4E | $Na_2CO_3$ | Reverse | 80° C. | 26 | 0.99 |
| 4F | $NaHCO_3$ | Reverse | 60° C. | 74 | 2.13 |
| 4G | $NaHCO_3$ | Reverse | 80° C. | 23 | 0.87 |
| 4H | $KHCO_3$ | Reverse | 60° C. | 51 | 0.94 |

*Precipitation Mode:
Forward - The precipitant is added to the Ni/Al solution.
Reverse - The Ni/Al solution is added to the precipitant.
Parallel - The two solutions are admixed simultaneously.
**Pore size Distribution % - Defines the percentage of pores between 12-120 A.

GASIFICATION TESTS ON EXAMPLES 1 and 4A

The catalysts described in Examples 1 and 4A were subjected to gasification tests under the following conditions:
Pressure—650 psig
Feedstock—LDF 170
Steam/Feed Ratio—2:1
Inlet Temp (Initial)—450° C.
Outlet Temp—520° C.
The gas composition (v/v) in each case was:
$CO_2$—12.25
CO—0.45
$H_2$—7.42
$CH_4$—33.15
$H_2O$—46.73

The performance of the catalysts are shown in FIG. 1 in which the amount of distillate gasified is plotted against the amount of catalyst occupied by the reaction zone.

On this plot there is obviously not very much difference between the catalysts, but in the tests a very significant difference was found. In any gasification test polymer laydown occurs, reducing the methanation activity, and deepening the endotherm at the start of the bed. With the catalyst of Example 1 only a very small endotherm was formed and this deepend only very slowly indicating a good resistance to polymer deactivation. The reaction preheat is conventionally raised to increase catalyst activity when the endotherm has fallen to 440° C. It was found that for the catalyst of Example 4 the preheat had to be raised after 348 hours whereas for the catalyst of Example 1 the preheat was not required to be raised until 1002 hours had elapsed.

It is quite clear from this result that the catalysts of the invention are much better than the conventional catalyst in respect of resistance to polymer deactivation.

GASIFICATION TEST ON CATALYST OF EXAMPLE 2

The catalyst of Example 2 was given a pilot plant test similar to that given for the catalyst of Example 1, but using a desulphurised kerosene feedstock at a preheat temperature of 500° C. (constant). The pressure, steam to feed ratio and outlet temperature were 650 psig, 2:1 and 576° C. respectively.

The composition of the product was:

| $CO_2$ | 12.47 | $CH_4$ | 31.41 |
|---|---|---|---|
| CO | 1.06 | $H_2O$ | 43.92 |
| $H_2$ | 11.14 | | |

FIG. 2 shows test performance plotted as for Examples 1 and 4. Included in this figure is the performance for another conventional catalyst containing 0.03% Na and 0.28% K and prepared by a method different from that of the present invention, tested under the same conditions. It is very clear from this Figure that the improved catalyst is very much better than the conventional catalyst for gasifying heavy feedstock.

It will be seen from the properties quoted in the various Examples that the catalysts of the invention all have a very high density. We have established that the ultimate solid in a catalyst has virtually the same density whatever the preparative method. It thus means that a high bulk density corresponds to a small volume of pores within the catalyst. We have also established that the pore size distribution is reduced catalysts is related to that of calcined, non-reduced catalysts. The distribution of sizes of small pores can be determined from the desorption isotherm of nitrogen at the liquid nitrogen boiling point.

We consider that the pore size distribution of the catalyst is of prime importance in determining the properties of the catalyst. Work by Moseley et al (J. Catalysis 1972 24, 18) showed that restricting the diffusion of reactants within a CRG catalyst, by changing from small granules to pellets, decreased the activity of the catalyst but markedly increased its stability and overall life. We think the effect of having a predominance of small pores in the catalyst also restricts ready access of the reactants to the catalyst surface and thereby increases its overall life.

A simple model of the CRG reaction envisages a two stage reaction; firstly a steam cracking of the hydrocarbon to hydrogen and carbon dioxide, followed by methanation:

$$4H_2 + CO_2$$

$$CH_4 + 2H_2O$$

At the start of the bed, where conversion is low, there is a high concentration of steam and low concentrations of carbon dioxide and hydrogen. Little methane will therefore be formed in the methanation equilibrium and the heat taken in by cracking the hydrocarbon will not be counterbalanced by heat of methanation, so the temperature will fall below the inlet temperature. Further down the bed, at higher conversions the concentrations of hydrogen and carbon dioxide will be higher and the steam lower, so methanation will go to a much greater extent. The heat of methanation will then be more than the heat taken in by cracking the hydrocarbon, and the temperature will rise above the inlet. This simple model therefore predicts the endotherm followed by exotherm behaviour illustrated in FIG. 3. The improved catalysts do not show this characteristic profile and we believe this can be explained by their pore size distribution. If reaction is going on within a narrow pore then diffusion between the reactants within the pore and the bulk of the reactants will be poor and the proportion of feed converted in the pore will be higher than the overall proportion converted. The catalyst in the pore will thus see conditions nearer to those in the end of a bed in a conventional catalyst with good diffusion. The reaction going on in the pore can thus be expected to be exothermic rather than endothermic and this explains the absence of endotherm in the improved catalyst. We believe it also explains the very good polymer resistance of the improved catalysts. In the pore the concentration of hydrocarbon will be lower and thus the mean hydrocarbon-steam ratio will be less than in the bulk phase outside the pellet. Moseley's (loc cit) work showed that there was a beneficial effect of operation at low hydrocarbon-steam ratios on the deactivation of catalysts by polymer deposition.

We claim:

1. A process for the production of methane-containing gases, said process including the steps of
    passing a mixture of steam and the vapor of a hydrocarbon feedstock having a boiling range up to that of gas oils over a coprecipitated catalyst such that a reaction therebetween occurs, said coprecipitated catalyst comprising a metal of Group VIII of the Periodic Table, alumina and optionally, minor amounts of an alkali or alkaline earth metal, wherein, in the calcined but unreduced form of the catalyst:
    (i) at least 55% of the pore volume of pores having a pore radius of between 12 and 120 Angstrom Units is in the range of 12 to 30 Angstrom Units, and
    (ii) the ratio (Q) of the pore volume contained in pores of radius 10 to 50 Angstrom Units to pore volume contained in pores of radius 50–300 Angstrom Units is at least 5:1, and
    controlling the physical conditions of said mixture and said catalyst such that said reaction is conducted at an elevated pressure and at a temperature of from 350° to 650° C. at the upstream end of said catalyst and at least 450° C. at the downstream end of said catalyst.

2. A process as claimed in claim 1 wherein said hydrocarbon feedstock is a gas oil.

3. A process as claimed in claim 1 wherein said hydrocarbon feedstock is kerosine.

4. A process as claimed in claim 1 wherein the reaction pressure is maintained at at least 25 atmospheres.

5. A process as claimed in claim 4 wherein the reaction pressure is maintained at at least 45 atmospheres.

6. A process as claimed in claim 1 wherein said mixture comprises at least 1.5 parts by weight of steam per 1 part by weight of hydrocarbon feedstock.

7. A process as claimed in claim 6 wherein the steam to hydrocarbon feedstock weight ratio is at least 2:1.

8. A process as claimed in claim 1 where the catalyst inlet temperature is maintained at at least 500° C.

* * * * *